United States Patent
Sudhues et al.

(10) Patent No.: US 12,457,935 B2
(45) Date of Patent: Nov. 4, 2025

(54) CUTTING MECHANISM WITH LONGITUDINALLY MOVABLE SUPPORT ELEMENT FOR SUPPORTING A CONVEYOR SURFACE

(71) Applicant: Carl Geringhoff GmbH & Co. KG, Ahlen (DE)

(72) Inventors: Steffen Sudhues, Ahlen (DE); Alexander Heitkamp, Dülmen (DE); Michael Pokriefke, Hude (DE)

(73) Assignee: Carl Geringhoff GmbH & Co. KG, Ahlen (DE)

( * ) Notice: Subject to any disclaimer, the term of this patent is extended or adjusted under 35 U.S.C. 154(b) by 899 days.

(21) Appl. No.: 17/761,608

(22) PCT Filed: Sep. 10, 2020

(86) PCT No.: PCT/EP2020/075389
§ 371 (c)(1),
(2) Date: Mar. 18, 2022

(87) PCT Pub. No.: WO2021/052867
PCT Pub. Date: Mar. 25, 2021

(65) Prior Publication Data
US 2022/0408644 A1    Dec. 29, 2022

(30) Foreign Application Priority Data
Sep. 19, 2019   (DE) .................... 10 2019 125 279.2

(51) Int. Cl.
*A01D 41/14*       (2006.01)
*A01D 57/20*       (2006.01)

(52) U.S. Cl.
CPC ............ *A01D 41/14* (2013.01); *A01D 41/141* (2013.01); *A01D 41/148* (2013.01); *A01D 57/20* (2013.01)

(58) Field of Classification Search
CPC .... A01D 41/14; A01D 41/141; A01D 41/148; A01D 57/20
See application file for complete search history.

(56) References Cited

U.S. PATENT DOCUMENTS 510,965 A  *  12/1893  Ferguson ............... A01D 87/02
                                                                      56/359
3,896,610 A  *   7/1975  Hiniker ................... A01D 41/14
                                                                      56/15.8

(Continued)

FOREIGN PATENT DOCUMENTS

DE            2638685 C2  *  6/1982  ............ A01D 34/30
DE   10 2011 116 341        3/2013

*Primary Examiner* — Arpad Fabian-Kovacs
(74) *Attorney, Agent, or Firm* — Gudrun E. Huckett

(57) ABSTRACT

The invention relates to a cutting mechanism (4) for installing onto a harvesting machine (2), comprising a frame (6) that has rocker arms (14) which point in the working direction and the front ends of which are secured to cutting elements (16) in order to cut the harvested crops, said rocker arms (14) together with the cutting elements (16) secured thereto being vertically movable relative to the frame (6). The aim of the invention is to provide an improved support for moving conveyor surfaces. This is achieved in that one or more support elements (20) are placed on the rocker arms (14), said support elements supporting conveyor surfaces (22) located above the rocker arms (14), and at least one of the support elements (20) is connected to the rocker arm (14) in a longitudinally movable manner.

10 Claims, 3 Drawing Sheets

(56) References Cited

U.S. PATENT DOCUMENTS

| | | | | |
|---|---|---|---|---|
| 4,011,709 | A * | 3/1977 | Mott | A01D 41/148 56/14.4 |
| 4,162,606 | A * | 7/1979 | Weichel | A01D 34/04 56/228 |
| 4,206,583 | A * | 6/1980 | Week | A01D 41/14 56/15.8 |
| 4,414,793 | A | 11/1983 | Halls | |
| 4,444,000 | A * | 4/1984 | Enzmann | A01D 41/16 56/DIG. 9 |
| 4,573,308 | A * | 3/1986 | Ehrecke | A01D 41/14 56/15.8 |
| 4,599,852 | A * | 7/1986 | Kerber | A01D 41/14 56/15.8 |
| 4,660,360 | A | 4/1987 | Hardesty et al. | |
| 5,711,140 | A * | 1/1998 | Burmann | A01D 41/148 56/14.4 |
| 6,099,429 | A | 8/2000 | Younger | |
| 6,351,931 | B1 * | 3/2002 | Shearer | A01D 57/20 56/DIG. 17 |
| 6,782,683 | B2 * | 8/2004 | Buermann | A01D 41/14 56/257 |
| 7,640,720 | B1 * | 1/2010 | Lovett | A01D 57/20 56/153 |
| 7,877,976 | B2 * | 2/2011 | Honas | A01D 41/14 56/208 |
| 7,971,418 | B2 * | 7/2011 | Conrad | A01D 41/148 56/181 |
| 7,975,462 | B1 * | 7/2011 | Figgins | A01D 41/14 56/181 |
| 7,992,374 | B1 * | 8/2011 | Bich | A01D 41/141 56/208 |
| 8,484,939 | B1 | 7/2013 | Cormier et al. | |
| 8,511,050 | B1 * | 8/2013 | Cormier | A01D 61/002 56/181 |
| 8,573,388 | B2 * | 11/2013 | Hoffman | B65G 23/44 198/816 |
| 8,752,359 | B2 * | 6/2014 | Cormier | A01D 41/14 56/181 |
| 9,591,802 | B2 * | 3/2017 | Allochis | A01D 34/18 |
| 10,314,234 | B2 * | 6/2019 | Schropp | A01D 41/14 |
| 10,390,486 | B2 * | 8/2019 | Hasenour | A01D 41/14 |
| 11,419,270 | B2 * | 8/2022 | Figgins | A01D 61/02 |
| 2007/0193243 | A1 * | 8/2007 | Schmidt | A01D 43/06 56/181 |
| 2007/0204589 | A1 * | 9/2007 | Coers | A01D 61/002 56/208 |
| 2008/0092508 | A1 * | 4/2008 | Talbot | A01D 61/002 56/181 |
| 2008/0271426 | A1 * | 11/2008 | Lohrentz | A01D 57/20 56/153 |
| 2009/0288383 | A1 * | 11/2009 | Sauerwein | A01D 57/20 56/181 |
| 2009/0320431 | A1 | 12/2009 | Puryk et al. | |
| 2012/0233974 | A1 * | 9/2012 | Cormier | A01D 57/20 56/181 |
| 2014/0041354 | A1 * | 2/2014 | Coon | A01D 41/06 56/158 |
| 2018/0368323 | A1 * | 12/2018 | Martens | A01D 61/02 |

* cited by examiner

CUTTING MECHANISM WITH LONGITUDINALLY MOVABLE SUPPORT ELEMENT FOR SUPPORTING A CONVEYOR SURFACE

BACKGROUND OF THE INVENTION

The present invention relates to a cutting mechanism with a frame for installation on a harvesting machine, the frame comprises rocker arms pointing in working direction, having at their forward ends cutting elements for cutting the crop, and the rocker arms, with the cutting elements connected thereto, are vertically movable in relation to the frame.

The prior art discloses various solutions as to how to make the rocker arms vertically movable relative to the frame. For example, it is known from the publication U.S. Pat. No. 4,660,360 A to connect as a cutting element a cutter bar, with a number of knifes connected thereto and arranged next to each other, to a number of profiled supports as rocker arms which are movably held at a respective pivot axis at the frame. The publication U.S. Pat. No. 4,414,793 discloses a cutting mechanism in which a number of spring elements hold the cutting element. The vertical movability of the rocker arms with the cutting elements fastened thereto serves the purpose that the cutting mechanism can adapt across its working width as precisely as possible to changing contours in the surface of the worked-on field.

The up and down movements of the individual rocker arms with the cutting elements attached thereto present the problem that thereby the distances between the cutting elements and the downstream conveyor surfaces for conveying the cut crop change. The downstream conveyor surfaces can be a cutting floor across which the cut crop is conveyed with conveying members such as, for example, a screw conveyor, or it can be an actively driven conveying member such as, for example, a belt conveyor, that conveys the cut crop to the rear or to the side. By compression and rebound movements of a rocker arm not only changes in the spatial position of the conveyor surfaces in vertical direction but also in horizontal direction result. This is true in particular when the conveyor surface adjoins the cutting elements so as to seal the transition from the cutting elements to the conveyor surface; then, the conveyor surface must join in any movement in horizontal direction that the cutting elements perform in order to avoid crop losses when the conveyor surface moves together with the rocker arm. A movement of the conveyor surfaces however creates a problem as to how the conveyor surfaces can be supported in a suitable manner. In addition, a sealing problem against crop loss is created at the side of the conveyor surfaces facing away from the cutting elements. When the conveyor surfaces are connected rigidly to the frame, sealing problems are created at the transition from the cutting elements to the conveyor surface.

It is the object of the present invention to find a solution for an improved support of moving conveyor surfaces.

SUMMARY OF THE INVENTION

The object is solved for a cutting mechanism of the aforementioned kind in that, on the rocker arms, one or a plurality of support elements are positioned that support conveyor surfaces arranged above the rocker arm and at least one of the support elements is connected in a longitudinally movable manner to the rocker arm.

By means of the support elements fastened in a longitudinally movable manner to the rocker arms, it is possible to better support the conveyor surfaces upon movements. When a relationship that is fixed or that stays at least approximately spatially the same is to be maintained between the support element and the conveyor surface, it is advantageous when at least one of the support elements is connected in a longitudinally movable manner to the rocker arm because the support element can then follow the movements of the conveyor surface in horizontal direction by its corresponding movability. In this context, the longitudinal movability is to be provided in particular in the work direction and opposite to the work direction of the cutting mechanism. The movability in vertical direction is provided by the connection to the vertically movable rocker arm by means of which the support element or support elements connected thereto are entrained.

Upon pivot movements of the rocker arm, the support element moves along the longitudinal axis of the rocker arm. The support element can engage around the rocker arm in order to move, guided by the form fit, along the rocker arm, and/or the support element is guided by grooves in the rocker arm into which tongues project that are embodied at the support element.

The support element can be connected fixedly to the conveyor surface but it is also possible to only form at the support element a support surface onto which the conveyor surface is placed, or the conveyor surface and the support element are connected to each other by a movable coupling element that enables relative movements between the support element and the conveyor surface.

According to an embodiment of the invention, one or a plurality of rocker arms are embodied as leaf spring packs. Leaf spring packs enable a particularly sensitive and flexible adjustment of the vertical position of the cutting mechanism.

According to an embodiment of the invention, the conveyor surfaces are fastened in the cutting mechanism such that the leading edge of the conveyor surfaces facing the cutting elements even for vertical movements of the cutting elements remains in a spatial relationship to the cutting elements that remains the same. In this way, the transition between the cutting elements and the conveyor surfaces can be designed optimally, and this optimal design does not change even for movements of the cutting elements. Constructions that are to cover gaps and steps caused by movements are dispensable. In particular when movably driven conveyor surfaces such as belt conveyors are used, the active conveyor surfaces can be positioned so as to extend closer to the cutting elements, whereby the conveyance of the cut crop immediately after the cutting action is improved. Crop losses are thereby further minimized.

According to an embodiment of the invention, the longitudinally movable support element is movably driven in its movement by one or a plurality of coupling rods which are supported at the leading section of the rocker arm or of the cutting element. The coupling rods are themselves rigid and define a distance between two points which is predetermined by their length. In case of a plurality of coupling rods arranged one behind the other and connected by a movable axle, minimal length changes of the coupling rods by buckling movements result but these are negligible however. The coupling rods are connected rotatably to their connecting points. When upon upward or downward movement of the rocker arm the distance is shortened between the leading section of the rocker arm or of the cutting element and the point where the support element connected to the coupling rods is located actually, the coupling rods move the support element along the rocker arm to the rear so that the distance between the leading section of the rocker arm or of the cutting element and the support element remains at least approximately the same. When the rocker arm pivots back into its initial position and in doing so the distance is enlarged between the leading section of the rocker arm or of the cutter element and the point where the support element connected to the coupling rods is located actually, the coupling rods pull the support element along the rocker arm to the front again. In this manner, the coupling rods transmit a movement of the cutting element to the support element in longitudinal direction upon compression and rebound movements. The support in the region of the leading section of the rocker arm refers to a region that is positioned in front of the support element that is moved by the coupling rod. The closer the leading support of the coupling rod is positioned to the cutting element, the smaller are the length differences which are produced as a result of vibration movements of the cutting element in relation to the longitudinally movable support element. But even for a support of the leading end of the coupling rod in the central region of the rocker arm, useful displacement movements of the support element result. This applies in particular also when a portion of the distance between the longitudinally movable support element and the cutting element is bridged by a rigid component that is different from a coupling rod. For example, the shaft of a belt conveyor, about which the belt conveyor circulates or by means of which the top side of the belt conveyor is supported, can also serve as coupling rod in the meaning of this invention.

According to an embodiment of the invention, a holding element that delimits the movable conveyor surface and guides it by followers is connected to the longitudinally movable support element. The connection can be embodied rigid or movable. Due to its longitudinal movability, the support element is well suited to ensure, even in case of movements of the conveyor surface in horizontal direction, that the conveyor surface is guided in doing so. This holds true in particular when a movably driven conveyor surface is concerned, as is the case in circulating conveying belts of a draper head. In the holding element, for example, a guide groove can be formed through which a shaped body passes which is formed at the circulating conveying belt and is shaped complementary to the guide groove. In the conveying direction of the circulating conveying belt, a guiding action is thus provided that holds the conveying belt in the nominal position. The holding element can also serve to secure the edge of the conveyor surface against crop loss in that it closes gaps to adjoining components, for example, by corresponding strips, stays, and sealing bodies which can also be produced of an elastic material.

According to an embodiment of the invention, a holding element that supports and guides a movable rear wall of the conveying path of the crop via the cutting mechanism is connected to the longitudinally movable support element. Upon movements of the conveyor surface in horizontal direction, differently sized gaps between the edge of the conveyor surface neighboring the rear wall and the rear wall would result, through which crop can be lost and undesirable material accumulations could build up that could limit the movability of the components and lead to damages at the components. Due to the movably designed rear wall, the latter can follow the movements of the conveyor surface in horizontal and/or vertical direction. In that the holding element is now designed such that it supports and guides the movably designed rear wall, the holding element transmits the movements of the rocker arm to the rear wall. The rear wall moves therefore synchronously to the conveyor surface. The generation of gaps of different sizes between the rear wall and the conveyor surface is prevented in this way.

According to an embodiment of the invention, the holding element seals the transition between the conveyor surface and the rear wall. Due to the additional sealing action, crop losses and the buildup of material accumulations are prevented. The sealing action is realized preferably by a closed surface of the holding element in the region of the transition from the conveyor surface to the rear wall.

According to an embodiment of the invention, the conveyor surface is formed by a circulating belt conveyor as conveying member. Such belt conveyors are used in particular in draper headers in order to actively convey cut crop. Especially in case of the belt conveyors, it is advantageous to maintain them in a fixed spatial relationship to the cutting elements upon movements of the cutting elements and to hold and to guide the circulating conveyor belts movably from their rear side.

According to an embodiment of the invention, the cutting elements are connected by a knife angle bracket to the rocker arm, wherein the knife angle bracket is embodied as profiled sheet metal, bridges the distance between the cutting elements and the conveyor surface, and is comprised of a plurality of segments sequentially arranged across the working width of the cutting mechanism and articulated to each other. The profiled sheet metal enables a good attachment of the cutting elements, an optimally designed transition from the cutting elements to the conveyor surface, and, due to the segments and their articulation to each other, the rocker arms to which the knife angle brackets are fastened remain vertically adjustable.

According to an embodiment of the invention, support elements of neighboring rocker arms are connected to each other by one or a plurality of coupling rods pivotably connected to the support elements. By means of the coupling rods, forces acting on the support elements are transmitted as in a truss to neighboring support elements and rocker arms so that movements can be dampened and made more uniform. Due to their pivotable connection, the pivotable coupling rods still enable deflection movements of individual rocker arms but, in vertical direction, they can dampen deflection movements of individual rocker arms that are too strong. The coupling rods are also suitable to support individual rocker arms against possible movements in a direction transverse to the forward travel direction. The coupling rods are also suitable to transmit restoring forces from a rocker arm to a neighboring rocker arm.

Viewed across the working width of a cutting mechanism, the coupling rods contribute to the spring movements of individual rocker arms being dampened and smoothed across the working width of the cutting mechanism.

It is expressly noted that the afore described embodiments of the invention, taken alone but also in any combinations with each other, can be combined with the subject matter of the independent claim as far as no technically forced obstacles are in conflict therewith.

Further modifications and configurations of the invention can be taken from the following subject matter description and the drawings.

BRIEF DESCRIPTION OF THE DRAWINGS

The invention will now be explained in more detail with the aid of embodiments. It is shown in.

DESCRIPTION OF PREFERRED EMBODIMENTS

Figure 1:
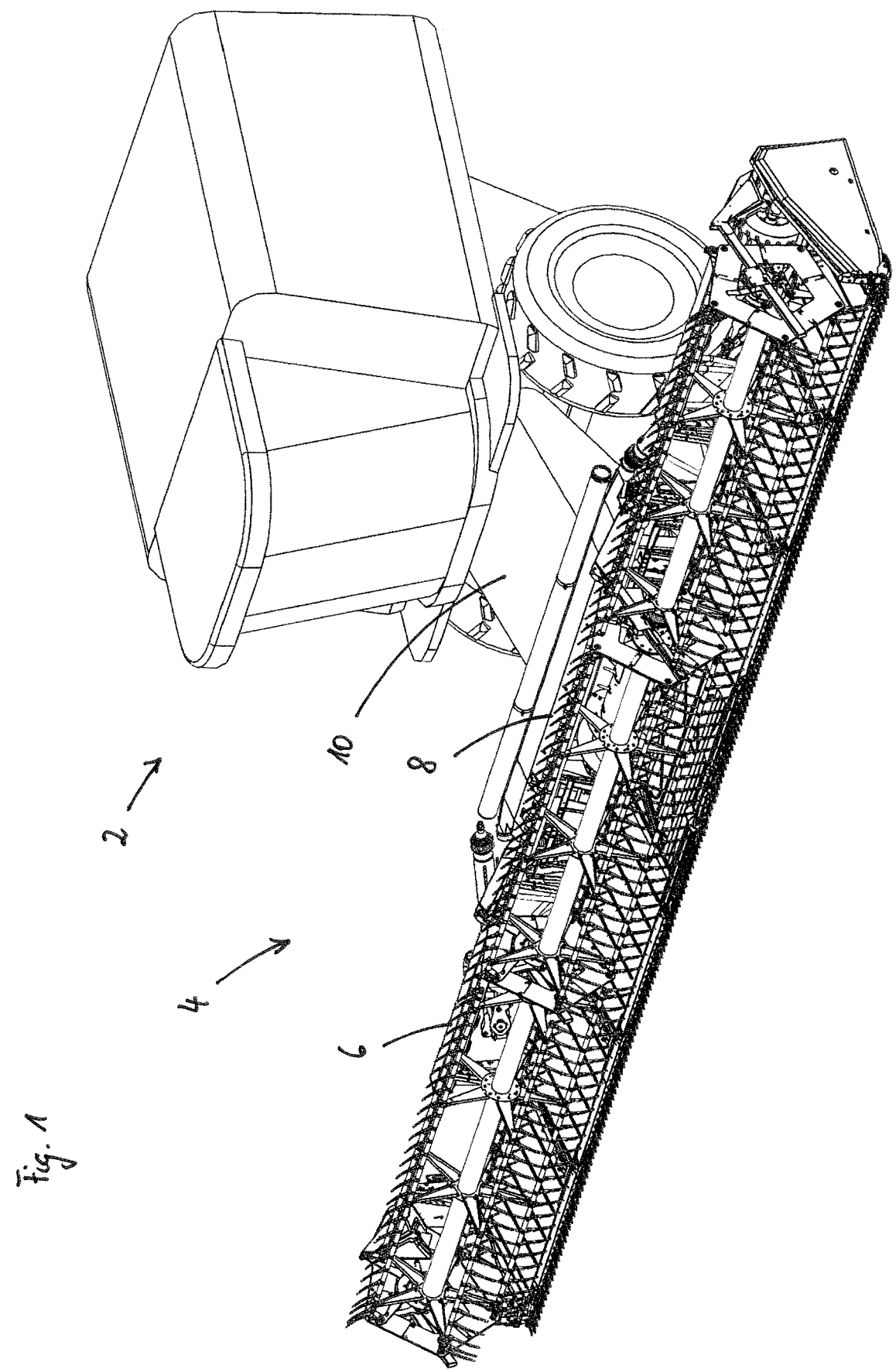
FIG. 1: a view at a slant from the front of a harvesting machine with cutting mechanism.

In FIG. 1, a view at a slant from the front of a harvesting machine 2 with a cutting mechanism 4 is illustrated. The cutting mechanism 4 comprises a frame 6 which is connected by an attachment frame 8 to the intake channel 10 of the harvesting machine 2.

Figure 2:
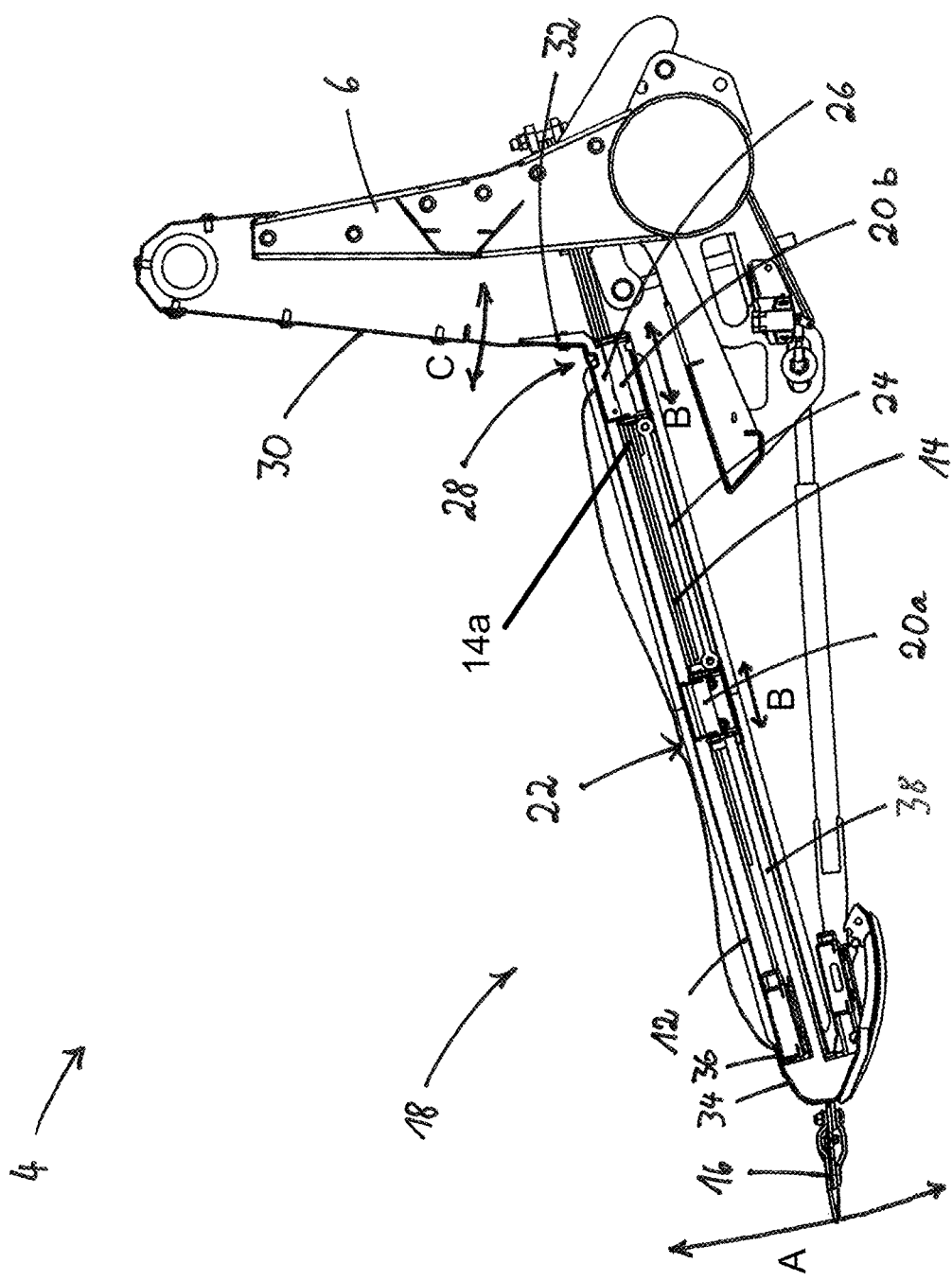
FIG. 2: a section view of the cutting mechanism.

In FIG. 2, a section view of the cutting mechanism 4 is illustrated. In the embodiment illustrated in FIG. 2, a circulating belt conveyor is illustrated as conveying member 12 and forms at its top side the conveyor surface 22. The invention can also be used for a belt conveyor that conveys the crop opposite to the working direction of the harvesting machine, for example, a central belt of a draper header. For the purpose of the invention, the conveyor surface 22 however must not be itself movable or driven movably; it can also be comprised of a rigid sheet metal floor across which conveying members such as, for example, a screw conveyor, convey the cut crop. For upward and downward movements of the cutting element 16 and of the rocker arm 14, which are indicated by a corresponding double arrow A, changes in the spatial position of the conveyor surface 22 result. The rocker arm 14 in the embodiment is designed as a leaf spring pack 14a that enables a flexible vertical adjustment of the cutting element 16 (double arrow A in FIG. 2). In deviation from the embodiment, rigid components such as, for example, a profiled sheet metal, can however be used also as rocker arm 14 which are connected by a pivot axis to the frame 6 and by means of the pivot axis are pivotable such that thereby the vertical position of the cutting elements 16 changes.

The conveyor surface 22 is supported and guided in respect to its conveying movement even in a changed spatial position. For this purpose, the support elements 20a, 20b are fastened in a longitudinally movable manner to the rocker arm 14, which is indicated by the two illustrated double arrows B in FIG. 2. The movements of the longitudinally movable support element 20b are transmitted in the embodiment via the coupling rod 24 which engages with its rearward end at the support element 20b and with its leading end at the support element 20a. The support element 20a is supported by a rigid torque support 38 at the leading end of the cutting mechanism 4. The torque support 38 acts in this manner like a further coupling rod 24. The coupling rod 24 and the torque support 38 transmit movements of the cutting element 16 in the longitudinal direction to the support elements 20a, 20b.

The support elements 20a, 20b can follow, due to their longitudinal movability, the movements of the conveyor surface 22 in a direction along the rocker arm 14. The support of the conveyor surface 22 in this manner can be maintained even for upward and downward movements of the cutting element 16. In order to hold and to guide the conveyor surface 22 upon upward and downward movements of the rocker arm 14 and of the cutting element 16, the rear support element 20 has positioned thereon a holding element 26 which is a V-shaped groove as follower 28 in the embodiment. The belt conveyor is provided on the inner side of its conveying belt with a vulcanized profile that has a shape complementary to the shape of the follower 28 and engages the cross section of the V-shaped groove as follower 28. When the support element 20b moves along the rocker arm 14, the follower 28 with its V-shaped groove entrains by means of the vulcanized profile the belt conveyor and moves the latter, corresponding to the longitudinal movement of the support element 20b, to the front or to the rear. In this way, the leading edge 36 of the belt conveyor in longitudinal direction of the rocker arm 14 always remains in a fixed spatial relationship to the cutting elements 16 and in a sealed contact in relation to the cutting element 16 so that at the leading edge 36 of the belt conveyor upon movement of the rocker arm 14 and/or of the cutting element 16 no gaps are produced which could produce crop loss and material accumulation. When the conveyor surface 22 is not formed by a circulating belt conveyor but by a rigid sheet metal, the follower 28 can also be embodied as a simple strap, hinge or the like.

The holding element 26 is provided with a stay 32 by means of which crop losses across the rear edge of the belt conveyor are avoided. The stay 32 as a component of the holding element 26 is also connected to the movable rear wall 30 that supports the conveying path of the crop via the cutting mechanism 4 to the rear and guides it. The movable rear wall is held through the stay 32 by the holding element 26. The movability of the movable rear wall 30 is also indicated by a double arrow C in FIG. 2. Upon movements of the longitudinally movable support element 20b, the holding element 26 entrains the movable rear wall 30 in the respective movement direction. Since the holding element 26 in the transition region between the conveyor surface 22 and the rear wall 30 comprises a closed surface, it seals the transition between the conveyor surface 22 and the rear wall 30.

The cutting elements 16 are connected by a knife angle bracket 34 to the rocker arm 14. The knife angle bracket 34 can be embodied as a profiled sheet metal and bridges the distance between the cutting elements 16 and the conveyor surface 22. The knife angle bracket 34 can be comprised of a plurality of segments sequentially arranged across the working width of the cutting mechanism 4 which are articulated to each other.

Figure 3:
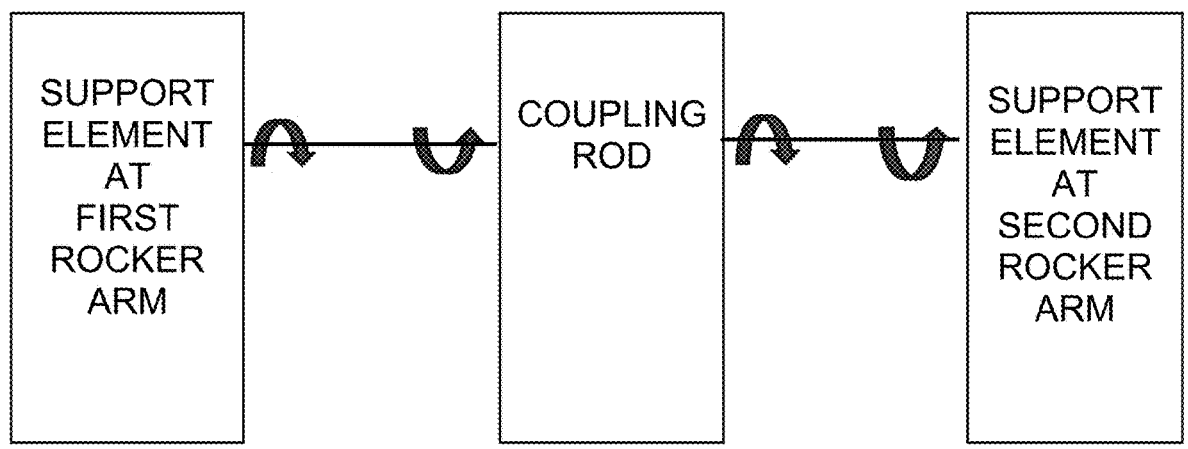
FIG. 3: schematically a coupling rod connected between support elements of neighboring rocker arms.

In an embodiment of the invention, support elements of neighboring rocker arms are connected to each other by one or a plurality of coupling rods pivotably connected to the support elements, as schematically illustrated in FIG. 3 by a coupling rod between support elements of first and second neighboring rocker arms. By means of the coupling rods, forces acting on the support elements are transmitted as in a truss to neighboring support elements and rocker arms so that movements can be dampened and made more uniform.

The invention is not limited to the afore described embodiments. A person of skill in the art will have no difficulties to modify the embodiments in a way appearing suitable to him in order to adapt them to a concrete application situation.

LIST OF REFERENCE CHARACTERS 2 harvesting machine
4 cutting mechanism
6 frame
8 attachment frame
10 intake channel
12 conveying member
14 rocker arm
16 cutting element
18 leading section
20 support element
22 conveyor surface
24 coupling rod 26 holding element
28 follower
30 rear wall
32 stay
34 knife angle bracket
36 leading edge
38 torque support

What is claimed is:

1. A cutting mechanism for installation at a harvesting machine, the cutting mechanism comprising:
    a frame comprising rocker arms, the rocker arms each comprising a longitudinal extension oriented in a working direction and each comprising a leading end in the working direction;
    cutting elements configured to cut crop and connected to the leading ends of the rocker arms;
    the rocker arms together with the cutting elements connected to the leading ends are configured to be vertically movable in relation to the frame;
    one or more support elements positioned on the rocker arms, respectively, and comprising a longitudinal extension extending along the longitudinal extension of the rocker arms;
    a conveyor surface arranged above the rocker arms and supported on the one or more support elements;
    wherein the one or more support elements include a longitudinally moveable support element connected to the respective rocker arm in a longitudinally movable manner so as to move along the longitudinal extension of the respective rocker arm when the respective rocker arm moves vertically.

2. The cutting mechanism according to claim 1, wherein one or more of the rocker arms are leaf spring packs.

3. The cutting mechanism according to claim 1, wherein the conveyor surface is fastened at the cutting mechanism such that a leading edge of the conveyor surface facing the cutting elements, even for vertical movements of the cutting elements, remains in a spatial relationship to the cutting elements that stays the same.

4. The cutting mechanism according to claim 1, further comprising a holding element connected to the longitudinally movable support element, wherein the holding element comprises a follower configured to guide a movement of the conveyor surface, wherein the holding element delimits the conveyor surface.

5. The cutting mechanism according to claim 1, further comprising a holding element connected to the longitudinally movable support element, wherein the holding element is connected to and guides a movable rear wall of a conveying path of the crop.

6. The cutting mechanism according to claim 5, wherein the holding element seals a transition between the conveyor surface and the moveable rear wall.

7. The cutting mechanism according to claim 1, wherein the conveyor surface is a circulating belt conveyor.

8. The cutting mechanism according to claim 1, wherein the cutting elements are connected by a knife angle bracket to the leading ends of the rocker arms, wherein the knife angle bracket is a profiled sheet metal and bridges a distance between the cutting elements and the conveyor surface, and wherein the knife angle bracket is comprised of a plurality of segments that are sequentially arranged across a working width of the cutting mechanism and are articulated to each other.

9. A cutting mechanism for installation at a harvesting machine, the cutting mechanism comprising:
    a frame comprising rocker arms oriented in a working direction and comprising leading ends in the working direction;
    cutting elements configured to cut crop and connected to the leading ends of the rocker arms;
    the rocker arms together with the cutting elements connected to the leading ends are configured to be vertically movable in relation to the frame;
    one or more support elements positioned on the rocker arms, respectively;
    a conveyor surface arranged above the rocker arms and supported on the one or more support elements;
    wherein the one or more support elements include a longitudinally moveable support element connected to the respective rocker arm in a longitudinally movable manner;
    wherein the longitudinally movable support element is configured to be moveably driven by one or more coupling rods supported at the leading section of the respective rocker arm.

10. A cutting mechanism for installation at a harvesting machine, the cutting mechanism comprising:
    a frame comprising rocker arms oriented in a working direction and comprising leading ends in the working direction;
    cutting elements configured to cut crop and connected to the leading ends of the rocker arms;
    the rocker arms together with the cutting elements connected to the leading ends are configured to be vertically movable in relation to the frame;
    one or more support elements positioned on the rocker arms, respectively;
    a conveyor surface arranged above the rocker arms and supported on the one or more support elements;
    wherein the one or more support elements include a longitudinally moveable support element connected to the respective rocker arm in a longitudinally movable manner;
    further comprising one or more coupling rods arranged between the rocker arms that are neighboring each other, wherein the one or more coupling rods are connected pivotably to the one or more support elements of the rocker arms that are neighboring each other.

* * * * *